(12) United States Patent
Li et al.

(10) Patent No.: US 9,311,838 B2
(45) Date of Patent: Apr. 12, 2016

(54) LIQUID CRYSTAL DISPLAY OF SWITCHING TO SHOW 2D/3D IMAGE

(71) Applicant: SHENZHEN CHINA STAR OPTOELECTRONICS TECHNOLOGY CO., LTD., Shenzhen (CN)

(72) Inventors: Meng Li, Shenzhen (CN); JinJie Wang, Shenzhen (CN)

(73) Assignee: SHENZHEN CHINA STAR OPTOELECTRONICS TECHNOLOGY CO. LTD, Shenzhen (CN)

(*) Notice: Subject to any disclaimer, the term of this patent is extended or adjusted under 35 U.S.C. 154(b) by 190 days.

(21) Appl. No.: 14/235,820

(22) PCT Filed: Jan. 6, 2014

(86) PCT No.: PCT/CN2014/070176
§ 371 (c)(1),
(2) Date: Jan. 29, 2014

(87) PCT Pub. No.: WO2015/096199
PCT Pub. Date: Jul. 2, 2015

(65) Prior Publication Data
US 2015/0194103 A1 Jul. 9, 2015

(30) Foreign Application Priority Data
Dec. 27, 2013 (CN) .......................... 2013 1 0737330

(51) Int. Cl.
G09G 5/10 (2006.01)
G09G 3/00 (2006.01)
H04N 13/00 (2006.01)
(Continued)

(52) U.S. Cl.
CPC .............. *G09G 3/003* (2013.01); *G09G 3/3648* (2013.01); *G09G 3/3659* (2013.01); *G09G 3/3677* (2013.01); *H04N 13/0033* (2013.01); *H04N 13/0452* (2013.01); *H04N 13/0497* (2013.01); *G09G 3/3614* (2013.01); *G09G 2300/0426* (2013.01); *G09G 2300/0819* (2013.01); *G09G 2300/0823* (2013.01); *G09G 2310/0251* (2013.01); *G09G 2320/0247* (2013.01); *H04N 13/0438* (2013.01)

(58) Field of Classification Search
CPC .............. G09G 2310/0247; G09G 2310/0428; G09G 3/3607; G09G 3/3614; G09G 3/003; G09G 3/3648; G09G 3/3659; G09G 3/3677; G09G 2310/0251; G09G 2300/0426; G09G 2300/0819; G09G 2300/0823; G09G 2320/0247; H04N 13/0033; H04N 13/0452; H04N 13/0497; H04N 13/0438
See application file for complete search history.

(56) References Cited

U.S. PATENT DOCUMENTS

| | | | | |
|---|---|---|---|---|
| 7,379,139 B2* | 5/2008 | Yamazaki | ............. | G02F 1/1362 345/104 |
| 8,519,908 B2* | 8/2013 | Lee | ......................... | G02B 27/26 345/6 |

(Continued)

Primary Examiner — Lun-Yi Lao
Assistant Examiner — Peter D McLoone
(74) Attorney, Agent, or Firm — Mark M. Friedman

(57) ABSTRACT

The present invention proposes an LCD of switching to show 2D/3D image. The LCD adds a plurality of switch units to every row of scan lines while no additional gate driver is added. The plurality of switch units separately control charging and charge sharing of pixel units, therefore pixel charging and charge sharing are separately controlled. Hence the present invention fixes flicker in 3D image display while no additional gate driver is added.

10 Claims, 3 Drawing Sheets

(51) Int. Cl.
*G09G 3/36* (2006.01)
*H04N 13/04* (2006.01)

(56) References Cited

U.S. PATENT DOCUMENTS

| | | | | |
|---|---|---|---|---|
| 8,896,499 B2* | 11/2014 | Park | ................ | G02B 27/2214 |
| | | | | 345/204 |
| 8,982,026 B2* | 3/2015 | Wu | ................ | G09G 1/136213 |
| | | | | 345/92 |
| 9,070,336 B2* | 6/2015 | Chiang | ................ | G09G 3/3659 |
| 9,087,472 B2* | 7/2015 | Chen | ................ | G09G 3/003 |
| 9,214,133 B2* | 12/2015 | Chen | ................ | G09G 5/02 |
| 9,218,777 B2* | 12/2015 | Yao | ................ | G09G 3/3659 |
| 2003/0179324 A1* | 9/2003 | Yamazaki | ................ | G02F 1/1362 |
| | | | | 349/43 |
| 2011/0227886 A1* | 9/2011 | Lee | ................ | G02B 27/26 |
| | | | | 345/204 |
| 2013/0033480 A1* | 2/2013 | Park | ................ | G02B 27/2214 |
| | | | | 345/212 |
| 2013/0044090 A1* | 2/2013 | Wu | ................ | G02F 1/136213 |
| | | | | 345/204 |
| 2013/0088654 A1* | 4/2013 | Kim | ................ | G09G 3/003 |
| | | | | 349/15 |
| 2013/0100108 A1* | 4/2013 | Chiang | ................ | G09G 3/3659 |
| | | | | 345/212 |
| 2014/0035968 A1* | 2/2014 | Chen | ................ | G09G 5/02 |
| | | | | 345/691 |
| 2014/0152640 A1* | 6/2014 | Chen | ................ | G09G 3/003 |
| | | | | 345/212 |
| 2014/0333513 A1* | 11/2014 | Park | ................ | G09G 3/3266 |
| | | | | 345/76 |
| 2015/0022507 A1* | 1/2015 | Yao | ................ | G09G 3/003 |
| | | | | 345/206 |

* cited by examiner

LIQUID CRYSTAL DISPLAY OF SWITCHING TO SHOW 2D/3D IMAGE

BACKGROUND OF THE INVENTION

1. Field of the Invention

The present Invention relates to a liquid crystal display (LCD), more particularly, to an LCD of switching to show 2D/3D image.

2. Description of Prior Art

Human feels images of the real world through what their eyes see. And human brains form the so-called 3-dimension (3D) images according to spatial difference between two different angles reflected in right and left eyes. The so-called 3D display device imitates prospect of two different angles of right and left human eyes, so that users feel like watching 3D images while 2D images are actually displayed.

Conventional LCD uses charge sharing to solve color shift. But to LCD switching from 2D to 3D modes, when 3D mode is initiated, charge sharing is ineffective due to frame inversion, resulting in flicker in 3D image.

More specifically, when LCD is under 3D mode, grey level position is actually a mixture of white and black, i.e. white and black images rotate as the first and the second frame alternatively, after mixture white and black reflect as grey in human eyes. Take frame inversion driving method as instance, every frame polarity inverses once. White image indicates a greater voltage drop with positive polarity, and black image indicates a greater voltage drop with negative polarity. If continuously displaying images like these, LCD is polarized resulting in residual image.

To fix residual image, a conventional method is change frequency of inversion from once every frame to once every two frames, which causes different luminance to right and left eyes due to high charging saturation of the second polar frame, and meanwhile leaves flicker unsolved.

To fix flicker, separately controlling pixel charging and charge sharing is feasible, i.e. besides scan lines a plurality of driving lines have to be set up to control charge sharing corresponding to every scan line, which doubles number of gate driver and increases production cost.

SUMMARY OF THE INVENTION

An object of the present invention is to provide an LCD of showing 2D/3D image to fix flicker in 3D image display while no additional gate driver is added.

According to the present invention, a liquid crystal display (LCD) of switching to show 2D/3D image comprises: a scan line for sending a scan signal, a data line for sending a grey level signal, a plurality of pixel units on a first row for showing grey level according to the grey level signal, a controlling signal generator for generating a first controlling signal, a second controlling signal, a third controlling signal and a fourth controlling signal, a first switch unit electrically connected to the scan line and the pixel units on the first row, a second switch unit electrically connected to a constant voltage and the pixel units on the first row, a third switch unit, electrically connected to the scan line and the charge sharing switch, a fourth switch unit, electrically connected to the constant voltage, and a charge sharing switch, electrically connected between two pixels on the first row. The first switch unit is used for conducting the scan signal to the pixel units on the first row when receiving the first controlling signal. The second switch unit is used for conducting the constant voltage to the pixel units on the first row when receiving the second controlling signal. The charge sharing switch is used for electrically connecting the two pixels on the first row when receiving a charge sharing signal and turning on. The third switch unit is used for conducting the scan signal to turn on the charge sharing switch when receiving the third controlling signal. The fourth switch unit is used for conducting the constant voltage to turn off the charge sharing switch when receiving the fourth controlling signal.

In one aspect of the present invention, a process of the scan line sending the scan signal to the pixel units comprises a first period of time and a second period of time-when the LCD is under 2D mode. During the first period of time, the first switch unit and the fourth switch unit are turned on while the second switch unit, the third switch unit and the charge sharing switch are turned off, resulting in the pixel units on the first row displaying grey level according to the grey level signal. During the second period of time, the second switch unit, the third switch unit, and the charge sharing switch are turned on while the first switch unit and the fourth switch unit are turned off, resulting in an electrical connection between the two pixel units on the first row.

In another aspect of the present invention, the first period of time and the second period of time are successive.

In another aspect of the present invention, the LCD further comprises a fifth switch unit and a sixth switch unit. The fifth switch unit is electrically connected to the scan line and a plurality of pixel units on a second row, and is used for conducting the scan signal to the plurality of pixel units on the second row when receiving a fifth controlling signal. The sixth switch unit is electrically connected to the constant voltage and the plurality of pixel units on the second row, and is used for conducting the constant voltage to turn of the charge sharing switch when receiving a sixth controlling signal.

In another aspect of the present invention, the process of the scan line sending the scan signal to the pixel units further comprises a third period of time when the LCD is under the 2D mode. During the first period of time and the second period of time, the fifth switch unit is turned off while the sixth switch unit is turned on to conduct the constant voltage. During the third period of time, the fifth switch is turned on to conduct the scan signal while the sixth switch unit is turned off, resulting in the plurality of pixel units on the second row displaying grey level according to the grey level signal.

In another aspect of the present invention, the LCD further comprises a fifth switch unit and a sixth switch unit. The fifth switch unit is electrically connected to the scan line and a plurality of charge sharing switches on a second row, and is used for conducting the scan signal to the plurality of charge sharing switches on the second row when receiving a fifth controlling signal. The sixth switch unit is electrically connected to the constant voltage and the plurality of charge sharing switches on the second row, and is used for conducting the constant voltage to the charge sharing switch on the second row when receiving a sixth controlling signal.

In another aspect of the present invention, the process of the scan line sending the scan signal to the pixel units further comprises a third period of time when the LCD is under the 2D mode. During the first period of time and the second period of time, the fifth switch unit is turned off while the sixth switch unit is turned on to conduct the constant voltage. During the third period of time, the fifth switch is turned on to conduct the scan signal to turn on the charge sharing switches on the second row while the sixth switch unit is turned off.

In another aspect of the present invention, the third switch unit is turned off and the fourth switch unit is turned on when the LCD is under the 3D mode.

In still another aspect of the present invention, the process of the scan line sending the scan signal to the pixel units further comprises a fourth period of time and a fifth period of time when the LCD is under 3D mode. During the fourth period of time, the first switch unit and the sixth switch unit are turned on while the second switch unit and the fifth switch unit are turned off, resulting in the pixel units on the first row displaying grey level according to the grey level signal. During the fifth period of time, the second switch unit and the fifth switch unit are turned on while the first switch unit and the sixth switch unit are turned off, resulting in the pixel units on the second row displaying grey level according to the grey level signal.

In yet another aspect of the present invention, the fourth period of time and the fifth period of time are successive.

Compared to conventional art, the LCD in the present invention adds a plurality of switch units to every row of scan lines while no additional gate driver is added. The plurality of switch units separately control charging and charge sharing of pixel units, therefore pixel charging and charge sharing are separately controlled. Hence the present invention fixes flicker in 3D image display while no additional gate driver is added.

These and other features, aspects and advantages of the present disclosure will become understood with reference to the following description, appended claims and accompanying figures.

DETAILED DESCRIPTION OF THE PREFERRED EMBODIMENT

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
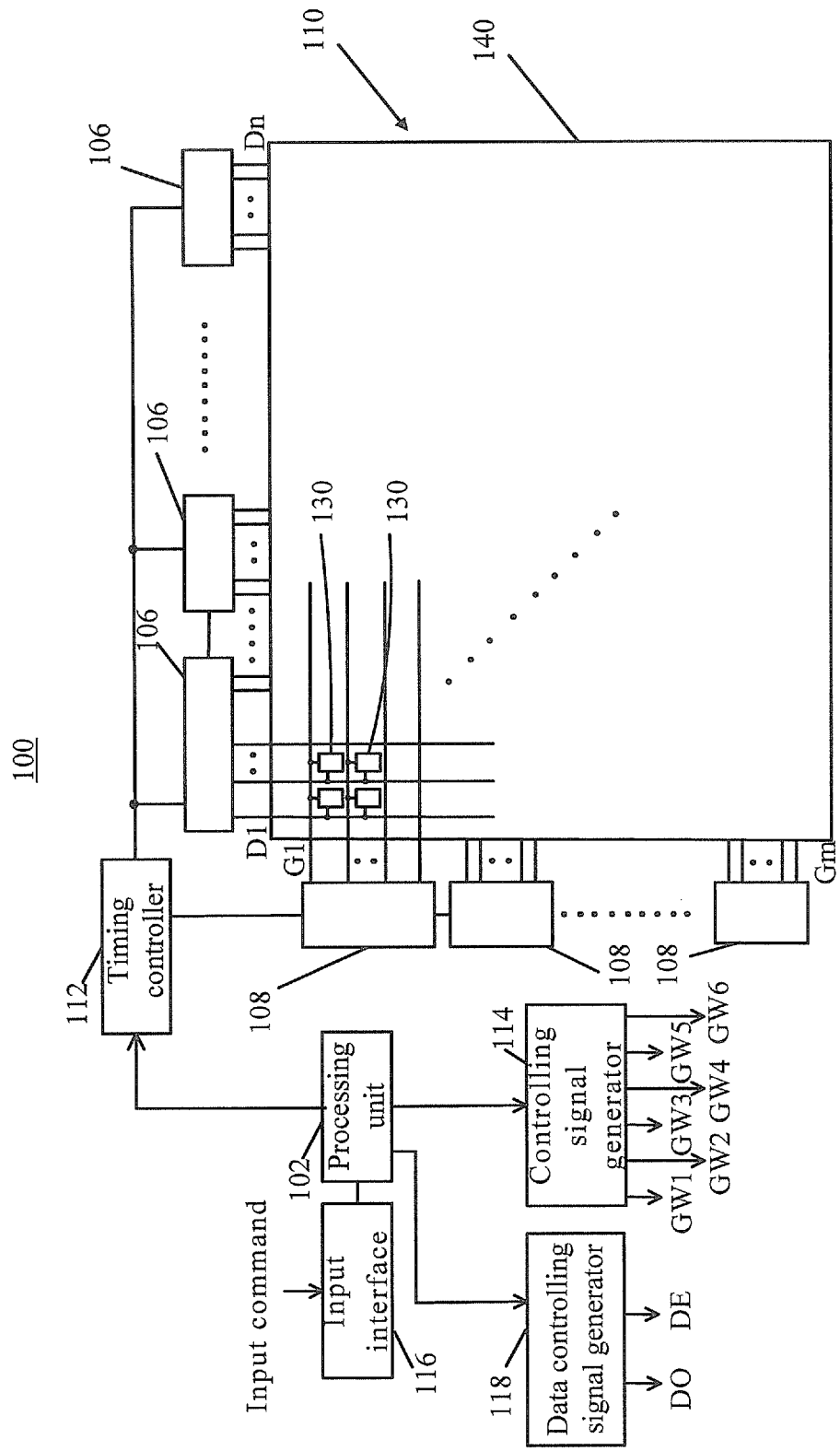
FIG. 1 shows a schematic diagram of an LCD capable of showing 3D images according to a second embodiment of the present invention.

Please refer to FIG. 1, FIG. 1 illustrates a diagram of an LCD 100 displaying 3D image according to a first embodiment of the present invention. Users are able to switch 2D and 3D images while watching the LCD 100. The LCD 100 comprises a processing unit 102, a plurality of source drivers 106, a plurality of gate drivers 108, a timing controller 112, a controlling signal generator 114, an input interface 116, a data controlling signal generator 118, and an LCD panel 110. The LCD panel 110 comprises a plurality of pixel units 130 and a substrate 140.

The processing unit 102 is central processor of personal computers or laptops to generate signal of a plural frames of 2D and 3D images. The input interface 116 is input device users control, such as buttons set up on the LCD 100 or menu displayed on the LCD 100 which selects initiate signal of 2D/3D image according to users' input command. The processing unit 102 is electrically connected to the input interface 116 and outputs signal of a plural frames of 2D or 3D images to the timing controller 112. The controlling signal generator 114 is electrically connected to the processing unit 102 and generates different controlling signal GW1-GW6 according to initiate signal of 2D/3D images. The data controlling signal generator 118 is electrically connected to the processing unit 102 and generates different data controlling signal DO and DE according to initiate signal of 2D/3D image. Every row of the pixel units 130 is corresponded to charge sharing signals GS1-GSm respectively.

The timing controller 112 is electrically connected to the processing unit 102 and generate frequency pulse signal to the gate driver 108, and also converse received 2D or 3D image signal into 2D or 3D data signal. The gate driver 108 outputs scan signal according to frequency pulse signal, and the source driver 106 converse signal above into grey level signal of different charge level. The source driver 106 and the gate driver 108 are set up on a chip on film (COF) (non-illustrated) or a chip of glass (COG) 140, and electrically connected through the COF. The gate driver 108 sends scan signal to every row of pixel units 130 in sequence through scan lines G1~Gm. Every row of the pixel units 130 display different grey level according to grey level signal from the source driver 106 through data lines D1~Dn after receiving scan signal.

Figure 2:
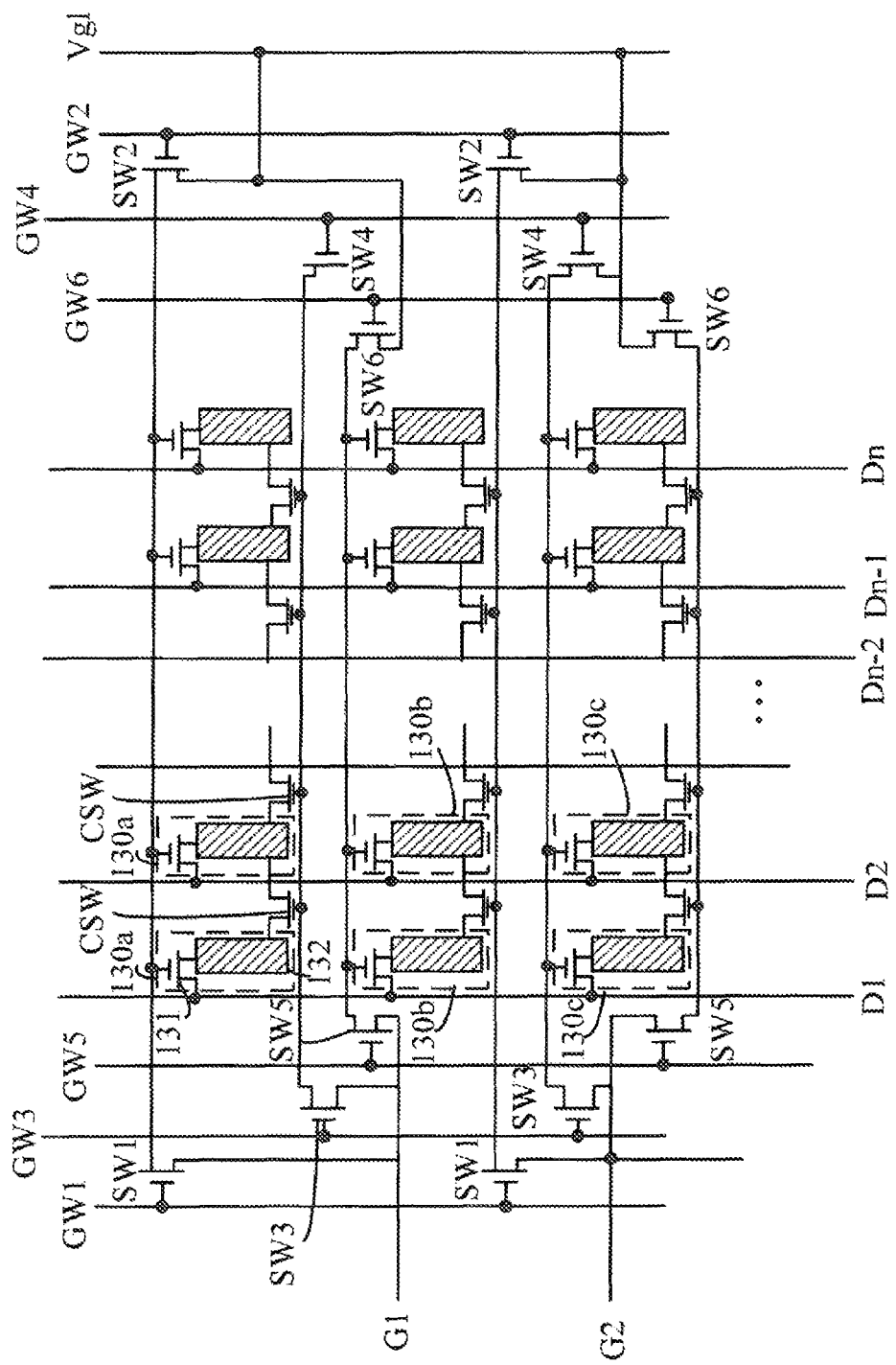
FIG. 2 is a diagram of an enlarged section of the LCD panel in FIG. 1.

Please refer to FIG. 2, a diagram of an enlarged section of the LCD panel 110 in FIG. 1. The plurality of pixel units 130 on the LCD panel 110 are one-to-one electrically connected to data lines D1~Dn and scan lines G1-Gm. The pixel units 130 comprise a first pixel unit 130a in a first row and a second pixel unit 130b in a second row. The LCD 100 also comprises a plurality of switch units. Every row of pixel units 130 is electrically connected to one switch unit. Every switch unit comprises a first switch SW1, a second switch SW2, a third switch SW3, a fourth switch SW4, a fifth switch SW5 and sixth switch SW6. Every data switch comprises a first data switch S1 and a second data switch S2. As every pixel unit 130 is electrically connected to similar elements, the following embodiment takes pixel units 130a and 130b as instance.

Figure 3:
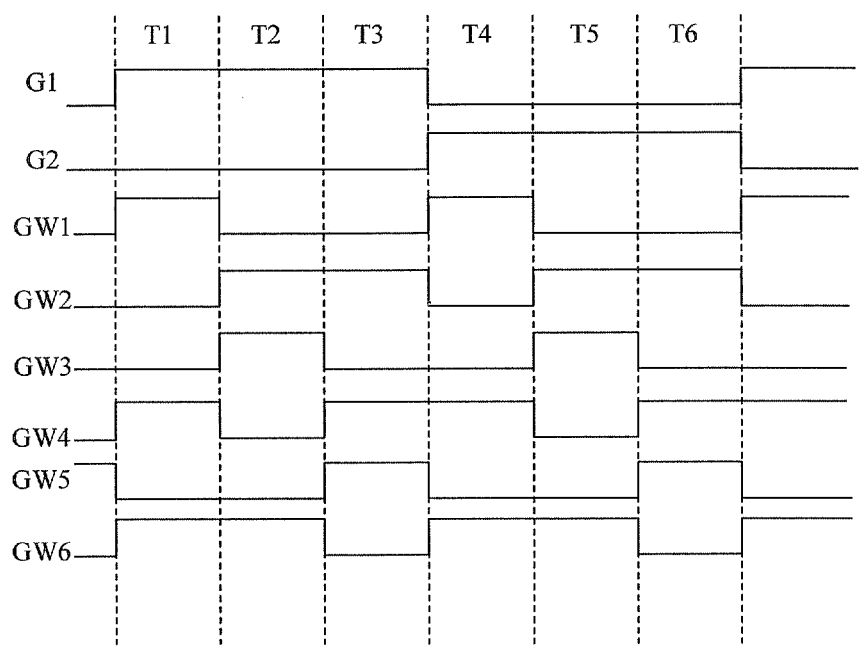
FIG. 3 is a timing diagram of the controlling signals GW1~GW6 under 2D mode of FIG. 2.

Please refer to FIG. 2 and FIG. 3. FIG. 3 is a timing diagram of controlling signals GW1-GW6 which are indicated in FIG. 2 under 2D mode. The first switch unit SW1, electrically connected to the scan line G1 and the first pixel unit 130a, is used for conducting scan signal from the scan line G1 to the first pixel unit 130a when receiving the first controlling signal GW1. The second switch unit SW2, electrically connected to a constant voltage Vg1 and the first pixel unit 130a, is used for conducting constant voltage Vg1 to the first pixel unit 130a when receiving the second controlling signal GW2.

The third switch unit SW3, electrically connected to the scan line G1 and a plurality of charge sharing switches CSW, is used for conducting scan signal to turn on the charge sharing switches CSW when receiving the third controlling signal GW3. The fourth switch unit SW4, electrically connected to the constant voltage Vg1 and the plurality of charge sharing switches CSW, is used for conducting the constant voltage Vg1 to turn off the charge sharing switches CSW when receiving the fourth controlling signal GW4. Preferably, a magnitude of the constant voltage Vg1 must be at low level and incapable of turning on the charge sharing switches CSW. The fifth switch unit SW5, electrically connected to the scan line G1 and the second pixel unit 130b, is used for conducting scan signal to the second pixel unit 130b when receiving the fifth controlling signal GW5. The sixth switch unit SW6, electrically connected to a constant voltage Vg1 and the second pixel unit 130b, is used for conducting constant voltage Vg1 to the second pixel unit 130 when receiving the sixth controlling signal GW6. Preferably, ++

The switch units SW1-SW6 and the charge sharing switches CSW are N-type metal oxide semiconductor (NMOS) transistors or P-type metal oxide semiconductor (PMOS) transistors.

When users keep the LCD 200 under 2D mode by input command through the input interface 116, the processing unit 102 initiates signal according to 2D images generated by that command, meanwhile the timing controller 112, the controlling signal generator 114 and the data controlling signal generator 119 provide 2D images with relevant signals. The scan lines G1~Gn send scan signals to every row of pixel units 130 in sequence. The two scan lines G1 and G2 sends scan signals to first and second rows of pixel units 130a and 130b, a process of which comprises a first period of time T1, a second period of time T2, a third period of time T3, a fourth period of time T4, a fifth period of time T5 and a sixth period of time T6. The first period of time T1 through the sixth period of time T6 are successive.

Take the pixel unit 130a connected to the first scan line G1 as instance. During the first period of time T1, the first controlling signal GW1, the fourth controlling signal GW4, and the sixth controlling signal GW6 are at high level. The second controlling signal GW2, the third controlling signal GW3, and the fifth controlling signal GW5 are at low level. Then the first switch unit SW1, the fourth switch unit SW4, and the sixth switch unit SW6 are turned on, meanwhile the second switch unit SW2, the fifth switch unit SW5, the third switch unit SW3 and the plurality of charge sharing units CSW on the first row are turned off. In this moment, the first pixel unit 130a displays grey level based on the grey level signal generated by the source driver 106.

During the second period of time T2, the second controlling signal GW2, the third controlling signal GW3 and the sixth controlling signal GW6 are at high level. The first controlling signal GW1, the fourth controlling signal GW4, and the fifth controlling signal GW5 are at low level. Then the second switch unit SW2, the third switch unit SW3, and the sixth switch unit SW6 are turned on. The first switch unit SW1, the fourth switch SW4, and the fifth switch unit SW5 are turned off. The source driver 106 does not send grey level signal to the data line D1, however the third switch SW3 conducts the scan signal to turn on the plurality of charge sharing switches CSW on the first row. Since the plurality of charge sharing switches CSW are turned on to electrically connect the first pixel units 130a on the first row, the first pixel units 130a on the first row are at the same level to realizing share charge.

During the third period of time T3, the second controlling signal GW2, the fourth controlling signal GW4, and the fifth controlling signal GW5 are at high level. The first controlling signal. GW1, the third controlling signal GW3, and the sixth controlling signal GW6 are at low level. Then the second switch unit SW2, the fourth switch unit SW4, and the fifth switch unit SW5 are turned on, meanwhile the first switch unit SW1, the third switch unit SW3, the sixth switch unit SW6, and the plurality of charge sharing units CSW on the first row are turned off. In this moment, the second pixel unit 130b displays grey level based on the grey level signal generated by the source driver 106.

Take the second pixel unit 130b connected to the second scan line G2 as instance. During the fourth period of time T4, the first controlling signal GW1, the fourth controlling signal GW4, and the sixth controlling signal GW6 are at high level. The second controlling signal GW2, the third controlling signal GW3 and the fifth controlling signal GW5 are at low level. Then the first switch unit SW1, the fourth switch unit SW4, the sixth switch unit SW6, and the plurality of charge sharing units CSW on the second row are turned on, meanwhile the second switch unit SW2, the third switch unit SW3, and the fifth switch unit SW5 are turned off. In this moment, the source driver 106 does not send grey level signal to the data lines D1-Dn, however the first switch SW1 conducts the scan signal to turn on the plurality of charge sharing switches CSW on the second row. Since the plurality of charge sharing switches CSW on the second row are turned on to electrically connect the second pixel units 130b on the second row, the second pixel units 130b on the first row are at the same level to realizing share charge.

During the fifth period of time T5, the second controlling signal GW2, the third controlling signal GW3 and the sixth controlling signal GW6 are at high level. The first controlling signal GW1, the fourth controlling signal GW4, and the fifth controlling signal GW5 are at low level. Then the second switch unit SW2, the third switch unit SW3, and the sixth switch unit SW6 are turned on. The first switch unit SW1, the fourth switch SW4, and the fifth switch unit SW5 are turned off. In this moment, the third pixel unit 130c on the third row displays grey level based on the grey level signal generated by the source driver 106.

During the sixth period of time T6, the second controlling signal GW2, the fourth controlling signal GW4, and the fifth controlling signal GW5 are at high level. The first controlling signal GW1, the third controlling signal GW3, and the sixth controlling signal GW6 are at low level. Then the second switch unit SW2, the fourth switch unit SW4, the fifth switch unit SW5, and the plurality of charge sharing switches CSW on the third row are turned on, meanwhile the first switch unit SW1, the third switch unit SW3, and the sixth switch unit SW6 are turned off. In this moment, the second pixel unit 130b displays grey level based on the grey level signal generated by the source driver 106. In this moment, the source driver 106 does not send grey level signal to the data lines D1-Dn, however the fifth switch SW5 conducts the scan signal to turn on the plurality of charge sharing switches CSW on the third row. Since the plurality of charge sharing switches CSW on the third row are turned on to electrically connect the third pixel units 130c on the third row, the third pixel units 130c on the third row are at the same level to realizing share charge.

Figure 4:
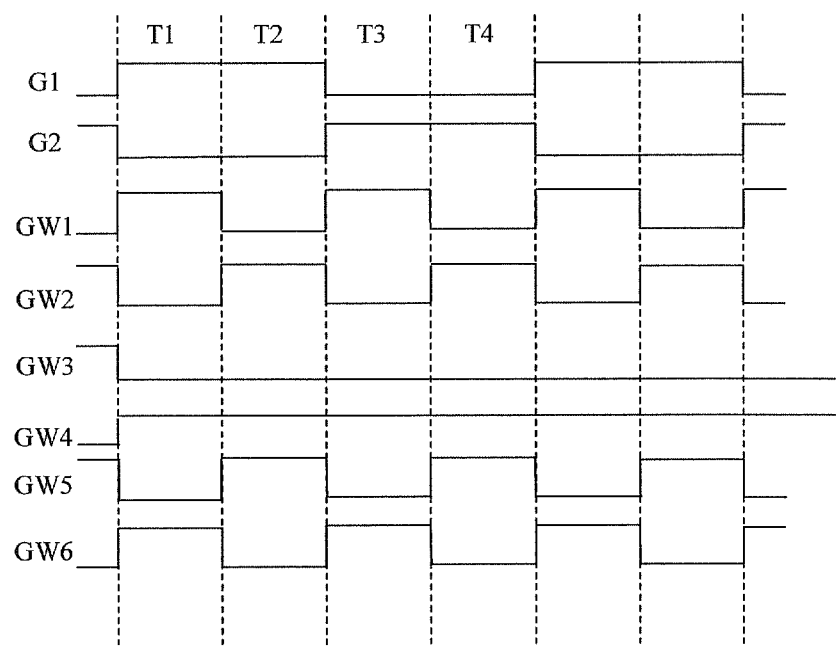
FIG. 4 is a timing diagram of the controlling signals GW1~GW6 under 3D mode of FIG. 2.

Please refer to FIG. 4. FIG. 4 is a timing diagram of the controlling signals GW1~GW6 under 3D mode of FIG. 2. When users keep the LCD 100 under 3D mode by input command through the input interface 116, the processing unit 102 controls the timing controller 112, the controlling signal generator 114 and the data controlling signal generator 119 to provide relevant signals of 3D image in response to a 3D image enabling signal generated by input command. The scan lines G1~Gn send scan signals to every row of pixel units 130 in sequence. The two scan lines G1 and G2 sends scan signals to first and second rows of pixel units 130a and 130b, a process of which comprises a first period of time T1, a second period of time T2, a third period of time T3, a fourth period of time T4, a fifth period of time T5 and a sixth period of time T6. The first period of time T1 through the sixth period of time T6 are successive.

Take the pixel unit 130a connected to the first scan line G1 as instance. During the first period of time T1, the first controlling signal GW1, the fourth controlling signal GW4, and the sixth controlling signal GW6 are at high level. The second controlling signal GW2, the third controlling signal GW3, and the fifth controlling signal GW5 are at low level. Then the first switch unit SW1, the fourth switch unit SW4, and the sixth switch unit SW6 are turned on, meanwhile the second switch unit SW2, the fifth switch unit SW5, the third switch unit SW3 and the plurality of charge sharing units CSW on the first row are turned off. In this moment, the first pixel unit 130a displays grey level based on the grey level signal generated by the source driver 106.

During the second period of time T2, the second controlling signal GW2, the fourth controlling signal GW4, and the fifth controlling signal GW5 are at high level. The first controlling signal GW1, the third controlling signal GW3, and the sixth controlling signal GW6 are at low level. Then the second switch unit SW2, the fourth switch unit SW4, and the fifth switch unit SW5 are turned on, meanwhile the first switch unit SW1, the third switch unit SW3, the sixth switch unit SW6, and the plurality of charge sharing units CSW on the first row are turned off. In this moment, the second pixel unit 130b displays grey level based on the grey level signal generated by the source driver 106.

It is noted that when the LCD 100 is operated under 3D mode, the fourth controlling signal G4 is always at high level and the third controlling signal G3 is always at low level. In this moment, the fourth switch unit SW4 turns on while the third switch unit SW3 and all of the charge sharing units CSW turn off. Accordingly, the LCD 100 does not enable charge sharing when operating under the 3D mode.

In sum, the LCD 100 in the present invention adds a plurality of switch units to every row of scan line while no additional gate driver is added. The plurality of switch units separately control charging and charge sharing of pixel units, therefore pixel charging and charge sharing are separately controlled. Hence the present invention fixes flicker in 3D image display while no additional gate driver is added.

The embodiments merely takes NMOS transistors as instance. However, a person having ordinary skill in the art is capable of using PMOS in lieu of NMOS.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD) of switching to show 2D/3D image, comprising:
a scan line for sending a scan signal;
a data line for sending a grey level signal;
a plurality of pixel units on a first row for showing grey level according to the grey level signal;
a controlling signal generator for generating a first controlling signal, a second controlling signal, a third controlling signal and a fourth controlling signal;
a first switch unit, electrically connected to the scan line and the pixel units on the first row, for conducting the scan signal to the pixel units on the first row when receiving the first controlling signal;
a second switch unit, electrically connected to a constant voltage and the pixel units on the first row, for conducting the constant voltage to the pixel units on the first row when receiving the second controlling signal;
a charge sharing switch, electrically connected between two pixels on the first row, for electrically connecting the two pixels on the first row when receiving a charge sharing signal and turning on;
a third switch unit, electrically connected to the scan line and the charge sharing switch, for conducting the scan signal to turn on the charge sharing switch when receiving the third controlling signal; and
a fourth switch unit, electrically connected to the constant voltage, for conducting the constant voltage to turn off the charge sharing switch when receiving the fourth controlling signal.

2. The LCD of claim 1, wherein a process of the scan line sending the scan signal to the pixel units comprises a first period of time and a second period of time when the LCD is under 2D mode;
during the first period of time the first switch unit and the fourth switch unit are turned on while the second switch unit, the third switch unit and the charge sharing switch are turned off, resulting in the pixel units on the first row displaying grey level according to the grey level signal;
during the second period of time, the second switch unit, the third switch unit, and the charge sharing switch are turned on while the first switch unit and the fourth switch unit are turned off, resulting in an electrical connection between the two pixel units on the first row.

3. The LCD of claim 2, wherein the first period of time and the second period of time are successive.

4. The LCD of claim 2, further comprising:
a fifth switch unit, electrically connected to the scan line and a plurality of pixel units on a second row, for conducting the scan signal to the plurality of pixel units on the second row when receiving a fifth controlling signal;
a sixth switch unit, electrically connected to the constant voltage and the plurality of pixel units on the second row, for conducting the constant voltage to turn off the charge sharing switch when receiving a sixth controlling signal.

5. The LCD of claim 4, wherein the process of the scan line sending the scan signal to the pixel units further comprises a third period of time when the LCD is under the 2D mode;
during the first period of time and the second period of time, the fifth switch unit is turned off while the sixth switch unit is turned on to conduct the constant voltage; and
during the third period of time, the fifth switch is turned on to conduct the scan signal while the sixth switch unit is turned off, resulting in the plurality of pixel units on the second row displaying grey level according to the grey level signal.

6. The LCD of claim 4, wherein the third switch unit is turned off and the fourth switch unit is turned on when the LCD is under the 3D mode.

7. The LCD of claim 4, wherein the process of the scan line sending the scan signal to the pixel units further comprises a fourth period of time and a fifth period of time when the LCD is under 3D mode;
during the fourth period of time, the first switch unit and the sixth switch unit are turned on while the second switch unit and the fifth switch unit are turned off, resulting in the pixel units on the first row displaying grey level according to the grey level signal; and
during the fifth period of time, the second switch unit and the fifth switch unit are turned on while the first switch unit and the sixth switch unit are turned off, resulting in the pixel units on the second row displaying grey level according to the grey level signal.

8. The LCD of claim 7, wherein the fourth period of time and the fifth period of time are successive.

9. The LCD of claim 2, further comprising:
a fifth switch unit, electrically connected to the scan line and a plurality of charge sharing switches on a second row, for conducting the scan signal to the plurality of charge sharing switches on the second row when receiving a fifth controlling signal;

a sixth switch unit, electrically connected to the constant voltage and the plurality of charge sharing switches on the second row, for conducting the constant voltage to the charge sharing switch on the second row when receiving a sixth controlling signal.

10. The LCD of claim 9, wherein the process of the scan line sending the scan signal to the pixel units further comprises a third period of time when the LCD is under the 2D mode;

during the first period of time and the second period of time, the fifth switch unit is turned off while the sixth switch unit is turned on to conduct the constant voltage; and during the third period of time, the fifth switch is turned on to conduct the scan signal to turn on the charge sharing switches on the second row while the sixth switch unit is turned off.

* * * * *